United States Patent
Chuang et al.

(10) Patent No.: US 11,156,695 B2
(45) Date of Patent: Oct. 26, 2021

(54) DOPPLER RADAR SENSOR WITH BONDWIRE INTERCONNECTION

(71) Applicants: Sil Radar Technology Inc., Kaohsiung (TW); National Cheng Kung University, Tainan (TW); NCKU Research and Development Foundation, Tainan (TW)

(72) Inventors: Huey-Ru Chuang, Tainan (TW); Cheng-Hsueh Chan, Tainan (TW); Chien-Chang Chou, Tainan (TW)

(73) Assignees: Sil Radar Technology Inc., Kaohsiung (TW); National Cheng Kung University, Tainan (TW); NCKU Research and Development Foundation, Tainan (TW)

( * ) Notice: Subject to any disclaimer, the term of this patent is extended or adjusted under 35 U.S.C. 154(b) by 379 days.

(21) Appl. No.: 16/446,966

(22) Filed: Jun. 20, 2019

(65) Prior Publication Data
US 2020/0025869 A1    Jan. 23, 2020

(30) Foreign Application Priority Data
Jul. 17, 2018    (TW) .................................. 107124710

(51) Int. Cl.
*G01S 7/03* (2006.01)
*G01S 13/56* (2006.01)
*H01Q 23/00* (2006.01)

(52) U.S. Cl.
CPC .............. *G01S 7/032* (2013.01); *G01S 13/56* (2013.01); *H01Q 23/00* (2013.01)

(58) Field of Classification Search
CPC . G01S 7/03; G01S 7/032; G01S 13/50; G01S 13/56; H01Q 23/00
See application file for complete search history.

(56) References Cited

U.S. PATENT DOCUMENTS 3,691,556 A * 9/1972 Bloice ...................... G01V 3/12
342/27
3,727,216 A * 4/1973 Antonio ............. G08B 13/1645
342/28

(Continued)

FOREIGN PATENT DOCUMENTS

TW    201546474 A    12/2015
TW    201735437 A    10/2017

OTHER PUBLICATIONS

Taiwanese Office Action dated Apr. 11, 2019 for Taiwanese Patent Application No. 107124710, 6 pages.
(Continued)

*Primary Examiner* — Peter M Bythrow
(74) *Attorney, Agent, or Firm* — Demian K. Jackson; Jackson IPG PLLC

(57) ABSTRACT

A Doppler radar sensor includes a radar and a bondwire interconnection. The bondwire interconnection is connected to a signal generator and an antenna of the radar and configured to transmit a radio frequency signal generated by the signal generator to the antenna and transmit a reflected signal received by the antenna to a demodulator of the radar. A metal strip, a first shunt bondwire and a second shunt bondwire of the bondwire interconnection can be used as a matching circuit of the antenna to decrease the transmission loss and increase the detection distance of the radar.

12 Claims, 4 Drawing Sheets

(56) References Cited

U.S. PATENT DOCUMENTS

| | | | | |
|---|---|---|---|---|
| 3,728,721 A * | 4/1973 | Lee | ............ | G01S 13/56 |
| | | | | 342/28 |
| 3,796,208 A * | 3/1974 | Bloice | ............ | A61B 5/113 |
| | | | | 600/534 |
| 3,801,978 A * | 4/1974 | Gershberg | ............ | G08B 13/2494 |
| | | | | 340/516 |
| 4,034,313 A * | 7/1977 | Jones | ............ | H03B 9/141 |
| | | | | 331/96 |
| 4,142,187 A * | 2/1979 | Nakayama | ............ | G08B 13/1627 |
| | | | | 340/554 |
| 5,583,468 A * | 12/1996 | Kielmeyer | ............ | H01L 24/49 |
| | | | | 333/247 |
| 5,880,657 A * | 3/1999 | Dorschky | ............ | H01P 3/081 |
| | | | | 333/246 |
| 6,302,701 B1 * | 10/2001 | Miller, Jr. | ............ | H01R 24/44 |
| | | | | 333/260 |
| 6,434,726 B1 * | 8/2002 | Goossen | ............ | G06F 30/39 |
| | | | | 333/246 |
| 6,535,161 B1 * | 3/2003 | McEwan | ............ | G01F 23/284 |
| | | | | 342/118 |
| 7,304,393 B1 * | 12/2007 | Greene | ............ | H03B 5/124 |
| | | | | 257/784 |
| 7,408,119 B2 * | 8/2008 | Qin | ............ | H01L 23/66 |
| | | | | 174/261 |
| 7,532,085 B2 * | 5/2009 | Tokumitsu | ............ | H01P 5/028 |
| | | | | 333/260 |
| 7,626,473 B2 * | 12/2009 | Kim | ............ | H01P 3/00 |
| | | | | 333/128 |
| 10,340,233 B1 * | 7/2019 | Saiz | ............ | H01P 11/003 |
| 2007/0170560 A1 * | 7/2007 | Gaucher | ............ | H01Q 9/16 |
| | | | | 257/676 |
| 2007/0275687 A1 * | 11/2007 | Forstner | ............ | G01S 7/35 |
| | | | | 455/333 |
| 2008/0077015 A1 * | 3/2008 | Boric-Lubecke | ............ | A61B 5/0507 |
| | | | | 600/453 |
| 2008/0137317 A1 | 6/2008 | Worl et al. | | |
| 2008/0291107 A1 * | 11/2008 | Tsai | ............ | H01Q 24/49 |
| | | | | 343/803 |
| 2011/0260943 A1 * | 10/2011 | Felic | ............ | H01Q 23/00 |
| | | | | 343/860 |
| 2012/0105304 A1 * | 5/2012 | Ma | ............ | H01Q 1/2283 |
| | | | | 343/906 |
| 2012/0229330 A1 | 9/2012 | Grebennikov et al. | | |
| 2013/0070817 A1 * | 3/2013 | McCormack | ............ | H01L 23/552 |
| | | | | 375/219 |
| 2014/0347234 A1 | 11/2014 | Caloz et al. | | |
| 2019/0216393 A1 * | 7/2019 | Baheti | ............ | H01L 23/5383 |

OTHER PUBLICATIONS

Cheng-Hsueh Chan et al., Integrated Packaging Design of Low-Cost Bondwire Interconnection for 60-GHz CMOS Vital-Signs Radar Sensor Chip With Millimeter-Wave Planar Antenna, IEEE Transactions on Components, Packaging and Manufacturing Technology, Jan. 5, 2018.

* cited by examiner

DOPPLER RADAR SENSOR WITH BONDWIRE INTERCONNECTION

FIELD OF THE INVENTION

This invention generally relates to a Doppler radar sensor, and more particularly to a Doppler radar sensor with bondwire interconnection.

BACKGROUND OF THE INVENTION

Conventional Doppler radar can detect subject movement information owing to the moving subject phase-modulates signals radiated from the Doppler radar, and the detection sensitivity of the Doppler radar is proportional to the frequency of the radiated signals. The higher frequency the radiated signal has, the higher transmission loss the Doppler radar has, so the detection distance and applied field of the Doppler radar operating at high frequency are restricted.

SUMMARY

The object of the present invention is to decrease transmission loss and increase detection distance of a Doppler radar sensor by using a bondwire interconnection coupled to a signal generator and an antenna.

A Doppler radar sensor of the present invention includes a radar and a bondwire interconnection. The radar includes a signal generator, an antenna and a demodulator. The signal generator is configured to generate a radio frequency signal. The antenna is configured to receive and radiate the radio frequency signal as a wireless signal to an object, and configured to receive a reflected signal from the object. The demodulator is coupled to the signal generator and the antenna and configured to receive the radio frequency signal and the reflected signal. The demodulator is configured to demodulate the reflected signal by using the radio frequency signal as a reference signal to obtain a displacement signal. The bondwire interconnection is coupled to the antenna and the signal generator, and the antenna is coupled to the signal generator via the bondwire interconnection. The bondwire interconnection includes a first metal strip, a first shunt bondwire and a second shunt bondwire. Two ends of the first shunt bondwire are coupled to the signal generator and the first metal strip, respectively, and two ends of the second shunt bondwire are coupled to the first metal strip and the antenna, respectively.

Through the bondwire interconnection which is connected to the antenna and the signal generator and used as the matching circuit of the antenna, the present invention can decrease the total loss and increase the detection distance of the Doppler radar sensor significantly.

DETAILED DESCRIPTION OF THE INVENTION

Figure 1:
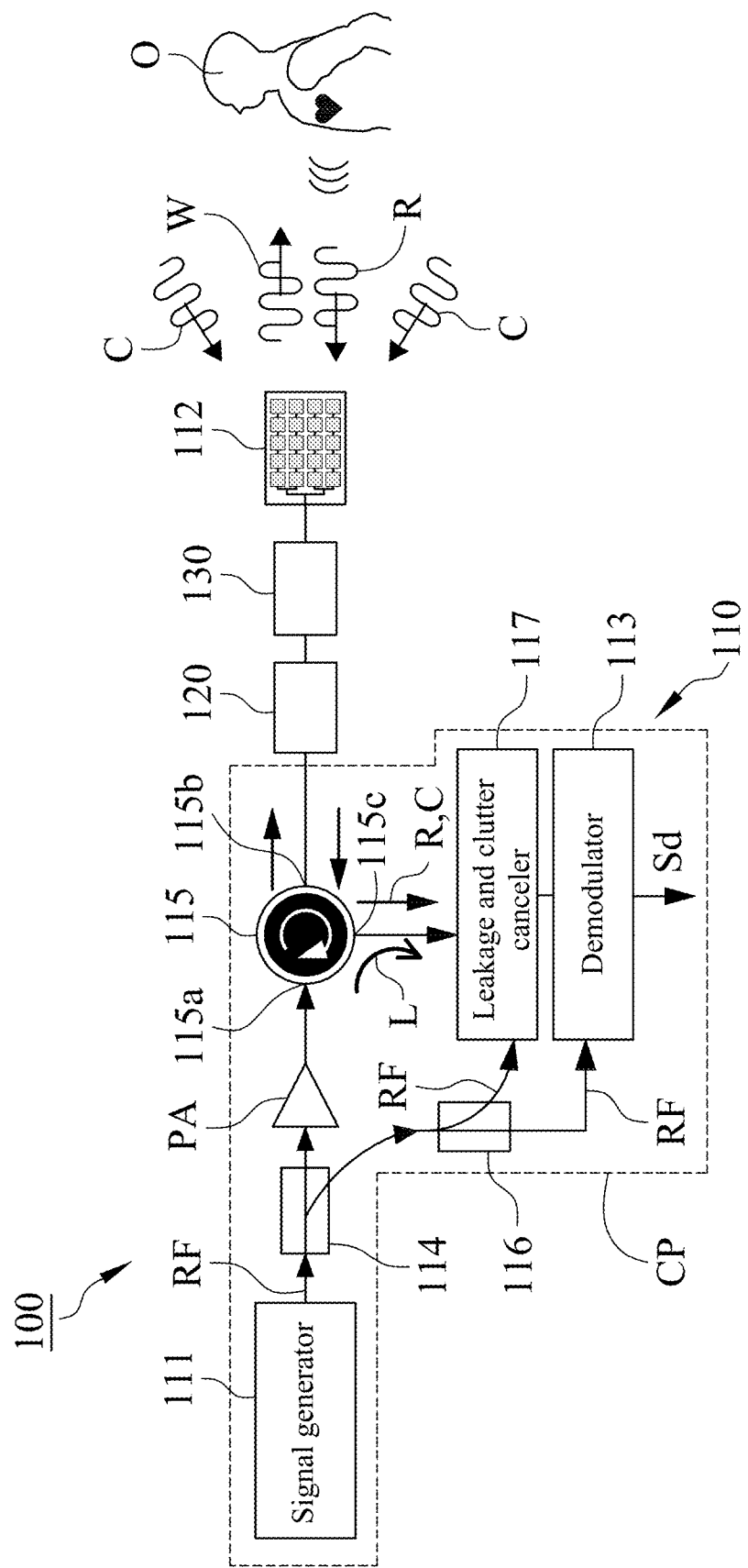
FIG. 1 is a circuit diagram illustrating a Doppler radar sensor with bondwire interconnection in accordance with one embodiment of the present invention.

With reference to FIG. 1, a Doppler radar sensor 100 of one embodiment of the present invention includes a radar 110, a bondwire interconnection 120 and a matching circuit 130. The bondwire interconnection 120 and the matching circuit 130 are electrically connected to the radar 110.

Figure 2:
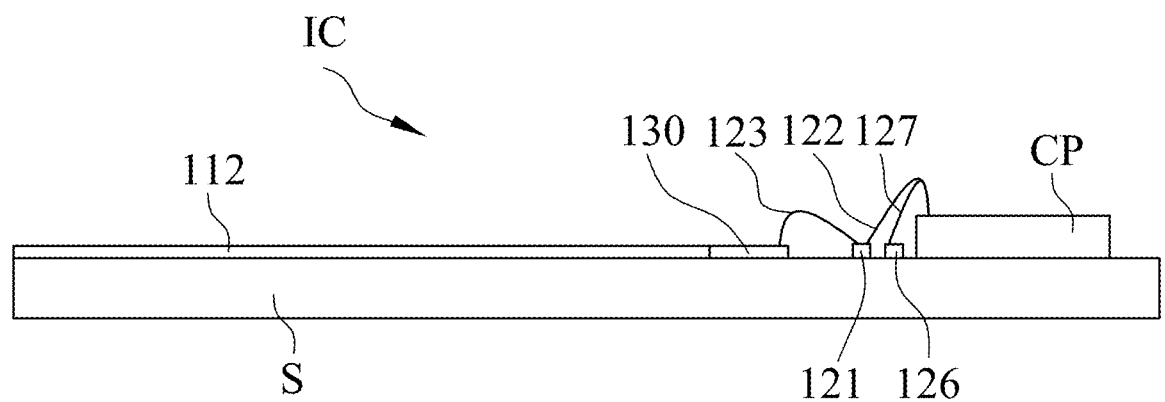
FIG. 2 is a side view diagram illustrating integrated circuits of the Doppler radar sensor with bondwire interconnection in accordance with one embodiment of the present invention.

With reference to FIGS. 1 and 2, the radar 110 includes a signal generator 111, an antenna 112, a demodulator 113, a first power divider 114, a circulator 115, a second power divider 116 and a leakage and clutter canceler 117. In this embodiment, the signal generator 111, the demodulator 113, the first power divider 114, the circulator 115, the second power divider 116 and the leakage and clutter canceler 117 are integrated in a chip CP, and the chip CP, the antenna 112 of the radar 110, the bondwire interconnection 120 and the matching circuit 130 are integrated on the substrate S. The radar 110, the bondwire interconnection 120 and the matching circuit 130 integrated in an integrated circuit IC have advantages such as small size, light weight and portable.

With reference to FIG. 1, the signal generator 111 is configured to generate a radio frequency signal RF, and the oscillation frequency range of the radio frequency signal RF is from 40 GHz to 80 GHz. In this embodiment, the oscillation frequency of the radio frequency signal RF is 60 GHz. The first power divider 114 is electrically connected to the signal generator 111. And the first power divider 114 is configured to receive and divide the radio frequency signal RF into two paths. The circulator 115 is coupled to the first power divider 114 via a power amplifier PA and configured to receive the radio frequency signal RF of one path, which is amplified by the power amplifier PA. In this embodiment, the circulator 115 has a first port 115a, a second port 115b and a third port 115c, the amplified radio frequency signal RF is transmitted to the first port 115a of the circulator 115 and output from the second port 115b of the circulator 115.

Figure 3:
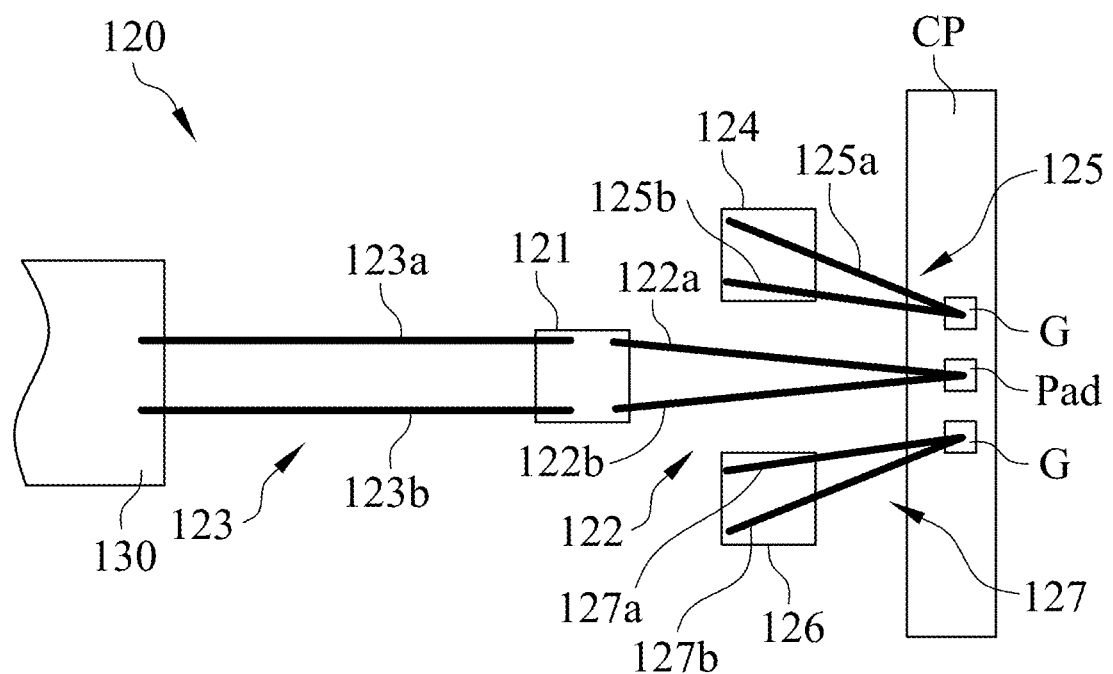
FIG. 3 is a schematic diagram illustrating a bondwire interconnection in accordance with one embodiment of the present invention.

With reference to FIG. 1, the bondwire interconnection 120 is electrically connected to the second port 115b of the circulator 115 and configured to receive the radio frequency signal RF from the circulator 115. With reference to FIGS. 2 and 3, the bondwire interconnection 120 includes a first metal strip 121, a first shunt bondwire 122 and a second shunt bondwire 123. The first metal strip 121 is disposed on the substrate S. One end of the first shunt bondwire 122 is coupled to the circulator 115 in the chip CP via a conductive pad P of the chip CP, and the other end of the first shunt bondwire 122 is electrically connected to the first metal strip 121. Two ends of the second shunt bondwire 123 are coupled to the first metal strip 121 and the matching circuit 130, respectively. In this embodiment, a first wire 122a and a second wire 122b are connected in shunt to form the first shunt bondwire 122, a third wire 123a and the fourth wire 123b are connected in shunt to form the second shunt bondwire 123. The first shunt bondwire 122 and the second shunt bondwire 123 are each regarded as inductors, and the first metal strip 121 is regarded as a capacitor. Consequently, the first metal strip 121, the first shunt bondwire 122 and the second shunt bondwire 123 compose an L-C-L circuit which is used as matching impedance of the antenna 112 to reduce the transmission loss.

With reference to FIGS. 2 and 3, for better grounding of the chip CP, the bondwire interconnection 120 preferably further includes a second metal strip 124, a third shunt bondwire 125, a third metal strip 126 and a fourth shunt bondwire 127. The second metal strip 124 and the third metal strip 126 are disposed on the substrate S, and the three metal strips 121, 124 and 126 are, but not limited to, arranged in a triangular configuration. Two ends of the third shunt bondwire 125 are coupled to the second metal strip 124 and one grounding pad G of the chip CP, respectively. Two ends of the fourth shunt bondwire 127 are coupled to the third metal strip 126 and another grounding pad G of the chip CP, respectively. The grounding pads G of the chip CP are electrically connected to a ground end of the radar 110. Preferably, a fifth wire 125a and a sixth wire 125b connected in shunt compose the third shunt bondwire 125, and a seventh wire 127a and a eighth wire 127b connected in shunt compose the fourth shunt bondwire 127.

Figure 4:
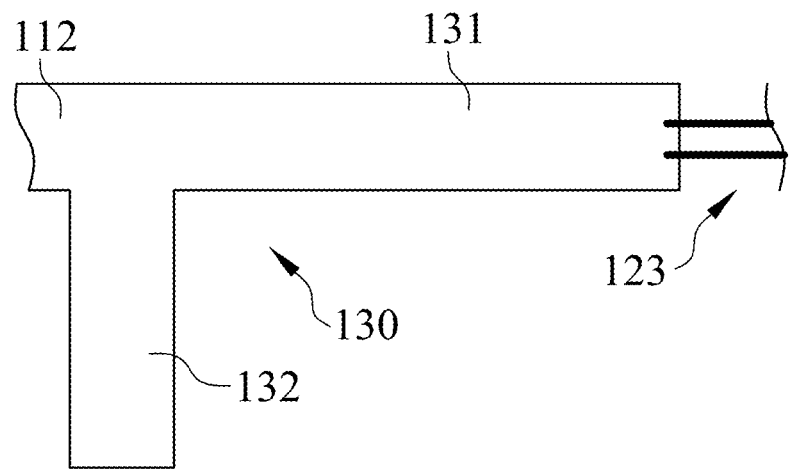
FIG. 4 is a schematic diagram illustrating a matching circuit in accordance with one embodiment of the present invention.

With reference to FIGS. 1, 3 and 4, wire lengths may be unexpected due to slight errors, e.g. metal strip shift, during the manufacture of the bondwire interconnection 120, so that the bondwire interconnection 120 may fail to achieve the anticipated inductance and the transmission loss may be increased. Hence, the matching circuit 130 is designed to be electrically connected to the second shunt bondwire 123 of the bondwire interconnection 120 for additional matching inductance and matching capacitance in this embodiment.

With reference to FIGS. 2 and 4, the matching circuit 130 includes a first transmission line 131 and a second transmission line 132 that are disposed on the substrate S. Two ends of the first transmission line 131 are electrically connected to the antenna 112 and the second shunt bondwire 123, respectively. One end of the second transmission line 132 is electrically connected to the first transmission line 131 and the other end of the second transmission line 132 is an open connection. The first transmission line 131 is connected in series with respect to the signal transmission and the second transmission line 132 is connected in parallel with respect to the signal transmission, such that the matching circuit 130 and the bondwire interconnection 120 can achieve the anticipated inductance and capacitance to match the impedance of the antenna 112.

With reference to FIGS. 1 and 2, the antenna 112, an array antenna in this embodiment, is installed on the substrate S and electrically connected to the matching circuit 130 so as to receive the radio frequency signal RF from the matching circuit 130. The antenna 112 is configured to radiate the radio frequency signal RF as a wireless signal W to an object O and receive a reflected signal R from the object O. If the object O is moving relative to the antenna 112, the displacement of the object O will cause the Doppler shifts in the wireless signal W and the reflected signal R will contain the Doppler components caused by the displacement of the object O too.

With reference to FIG. 1, the reflected signal R received by the antenna 112 is transmitted to the matching circuit 130, then transmitted to the second port 115b of the circulator 115 via the matching circuit 130 and the bondwire interconnection 120 and output from the third port 115c of the circulator 115.

With reference to FIG. 1, the antenna 112 not only receives the reflected signal R from the object O but also receives a clutter C from a background where the object O is located. The clutter C is also transmitted to the second port 115b of the circulator 115 via the matching circuit 130 and the bondwire interconnection 120 and output from the third port 115c of the circulator 115. Additionally, there may be a leakage signal L transmitted to the third port 115c of the circulator 115 when the radio frequency signal RF amplified by the power amplifier PA is input to the first port 115a of the circulator 115. Thus, the signal output from the third port 115c of the circulator 115 contains not only the reflected signal R having the Doppler components caused by the displacement of the object O, but also the clutter C and the leakage signal L. Demodulating the signal output from the circulator 115 by using the demodulator 113 can't obtain a displacement signal Sd of the object O. Preferably, the leakage and clutter canceler 117 in this embodiment is provided to cancel the leakage signal L and the clutter C.

With reference to FIG. 1, the second power divider 116 is electrically connected to the first power divider 114 and configured to receive the radio frequency signal RF of the other path from the first power divider 114. The second power divider 116 is further configured to divide the radio frequency signal RF into two paths. The leakage and clutter canceler 117 is electrically connected to the third port 115c of the circulator 115 and the second power divider 116. The leakage and clutter canceler 117 is configured to receive the reflected signal R, the clutter C and the leakage signal L from the third port 115c of the circulator 115 and receive the radio frequency signal RF of one path from the second power divider 116. The leakage and clutter canceler 117 is able to cancel the clutter C and the leakage signal L by adjusting the phase and amplitude of the radio frequency signal RF. The leakage and clutter canceler 117 in this embodiment includes a phase shifter (not shown), a variable gain amplifier (not shown) and a coupler (not shown). The phase shifter and the varied gain amplifier are configured to adjust the phase and amplitude of the radio frequency signal RF, respectively, and the coupler is configured to couple the radio frequency signal RF with the reflected signal R, the clutter C and the leakage signal L in order to cancel the clutter C and the leakage signal L.

The leakage and clutter canceler 117 preferably further includes a power detector (not shown) which is configured to detect the power levels of the reflected signal R, the clutter C and the leakage signal L for adjusting the phase shift displacement of the phase shifter and the gain level of the varied gain amplifier. If the minimum power level of the signal detected by the power detector is reached, it means that the radio frequency signal RF adjusted in phase and amplitude has cancelled the clutter C and the leakage signal L as much as possible. In other words, the phase displacement of the phase shifter and the gain of the varied gain amplifier are adjusted to optimal value for automatic clutter and leakage cancellation.

With reference to FIG. 1, the demodulator 113 is electrically connected to the second power divider 116 and the leakage and clutter canceler 117 so as to receive the radio frequency signal RF of the other path from the second power divider 116 and receive the reflected signal R from the leakage and clutter signal 117. The displacement of the object O can be obtained after demodulating the radio frequency signal RF by using the demodulator 113 because the leakage and clutter canceler 117 has cancelled the clutter C and the leakage signal L. In this embodiment, the demodulator 113 is configured to phase demodulate the reflected signal R by using the radio frequency signal RF as a reference signal to obtain the displacement signal Sd of the object O.

The displacement signal Sd of the object O may be formed from non-organism movement or tiny vibration caused by vital signs of organism. The detection object of the present invention is not limited to human of the embodiment.

Figure 5:
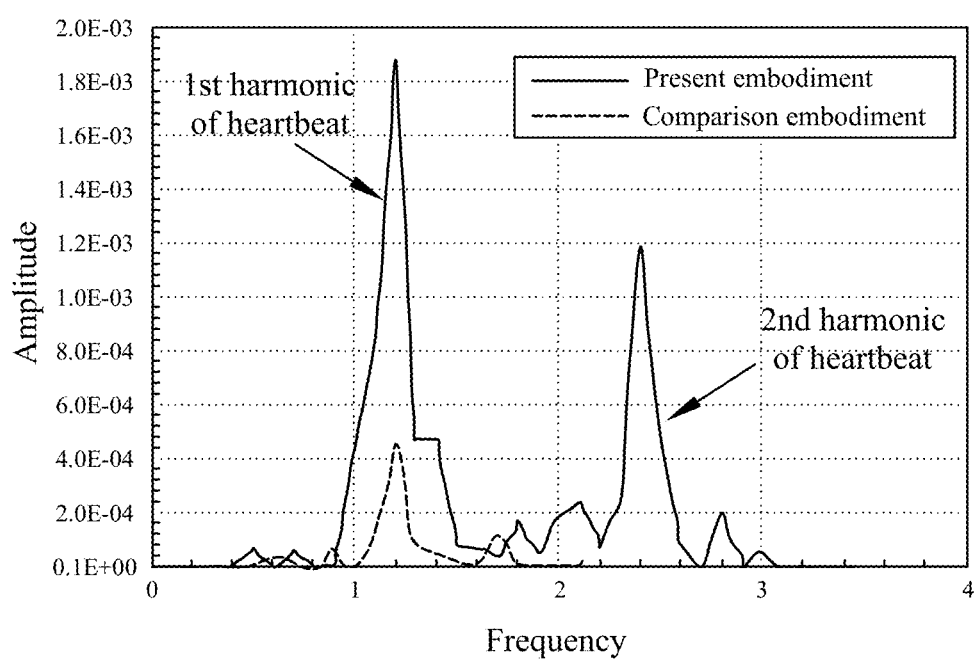
FIG. 5 shows measurement results of a present sensor and a comparison sensor.
Figure 6:
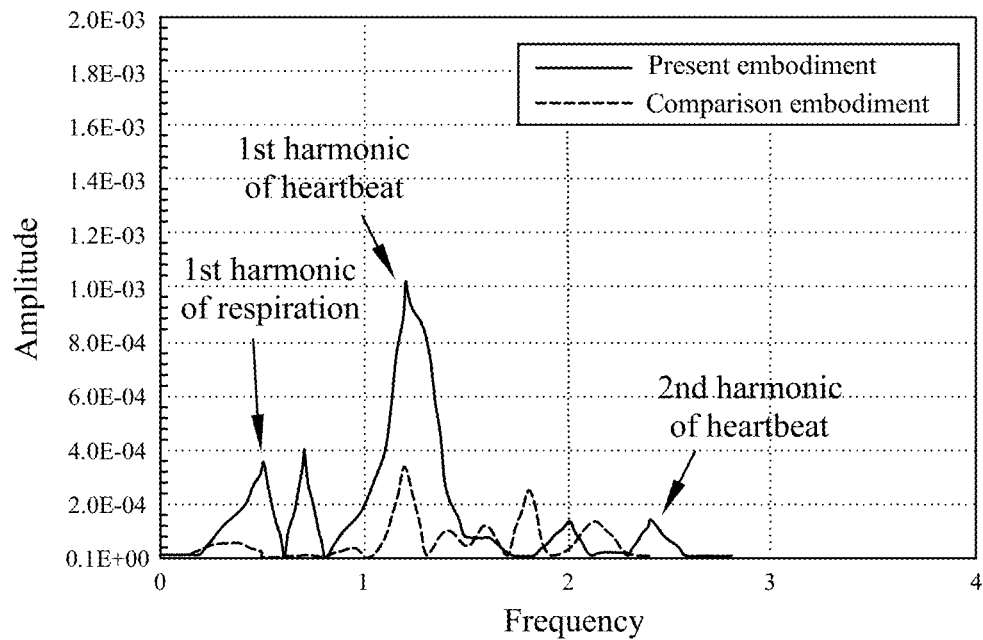
FIG. 6 shows measurement results of a present sensor and a comparison sensor.
Figure 7:
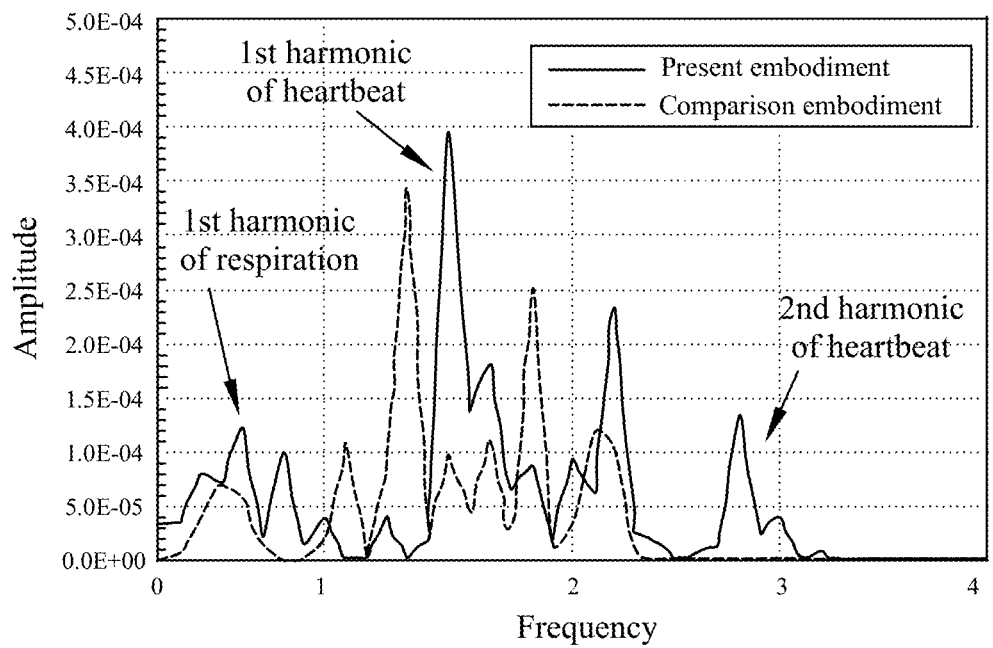
FIG. 7 shows measurement results of a present sensor and a comparison sensor.

FIGS. 5, 6 and 7 show three different test results by using the Doppler radar sensor 100 of this embodiment and a comparison radar sensor. The bondwire interconnection 120 and the matching circuit 130 are replaced by a 7-dB-loss coaxial cable in the comparison radar sensor. Solid and dotted lines in the diagrams represent the measurement results from the present and comparison radar sensors, respectively. In the first test, the present and comparison radar sensors are placed at a distance of 75 cm from a human subject and radiation beams are directed to human chest. The human subject is holding breathing so only the displacement caused by heartbeat is detected. Referring to FIG. 5, the amplitude of the displacement signal detected by the present radar sensor is 4-times higher than that detected by the comparison radar sensor. The bondwire interconnection 120 and the matching circuit 130 in the present radar sensor actually can reduce the transmission loss between the radar and the antenna to improve the detection distance of the radar. In the second test, the present and comparison radar sensors are placed at a distance of 75 cm from a human subject who is not holding breathing. Referring to FIG. 6, the displacements caused by heartbeat and respiration of the human subject are detected, and the frequency of heartbeat and respiration detected by the present radar sensor are more obvious than that detected by the comparison radar sensor. Heartbeat and respiration of the human subject are difficult to identify by using the comparison radar sensor. Different to first and second tests, the present and comparison radar sensors are placed at a distance of 105 cm from a human subject in the third test. Referring to FIG. 7, the present radar sensor is able to clearly detect the displacement signals caused by heart beat and respiration of the human subject, but the displacement signals detected by the comparison radar sensor are difficult to identify because of noise increment.

Through the bondwire interconnection 120 which is connected to the antenna 112 and used as the matching circuit of the antenna 112, the present invention can decrease the total loss and increase the detection distance of the Doppler radar sensor significantly.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. A Doppler radar sensor, comprising:
a radar including a signal generator, an antenna and a demodulator, the signal generator is configured to generate a radio frequency signal, the antenna is configured to receive and radiate the radio frequency signal as a wireless signal to an object and further configured to receive a reflected signal from the object, the demodulator is coupled to the signal generator and the antenna and configured to receive the radio frequency signal and the reflected signal, the demodulator is configured to demodulate the reflected signal by using the radio frequency signal as a reference signal to obtain a displacement signal; and a bondwire interconnection coupled to the antenna and the signal generator, the antenna is coupled to the signal generator via the bondwire interconnection, wherein the bondwire interconnection includes a first metal strip, a first shunt bondwire, a second shunt bondwire, a second metal strip, a third shunt bondwire, a third metal strip and a fourth shunt bondwire, two ends of the first shunt bondwire are coupled to the signal generator and the first metal strip, respectively, two ends of the second shunt bondwire are coupled to the first metal strip and the antenna, respectively, two ends of the third shunt bondwire are coupled to the second metal strip and a ground end of the radar, respectively, and two ends of the fourth shunt bondwire are coupled to the third metal strip and the ground end of the radar, respectively.

2. The Doppler radar sensor in accordance with claim 1, wherein a first wire and a second wire connected in shunt compose the first shunt bondwire, a third wire and a fourth wire connected in shunt compose the second shunt bondwire.

3. The Doppler radar sensor in accordance with claim 1, wherein a fifth wire and a sixth wire connected in shunt compose the third shunt bondwire, and a seventh wire and a eighth wire connected in shunt compose the fourth shunt bondwire.

4. The Doppler radar sensor in accordance with claim 1, wherein the first, second and third metal strips are arranged in a triangular configuration.

5. The Doppler radar sensor in accordance with claim 1 further comprising a matching circuit, wherein the matching circuit is coupled to the signal generator, and the second shunt bondwire of the bondwire interconnection is electrically connected to the matching circuit and coupled to the antenna via the matching circuit.

6. The Doppler radar sensor in accordance with claim 5, wherein the matching circuit includes a first transmission line and a second transmission line, two ends of the first transmission line are electrically connected to the antenna and the second shunt bondwire, respectively, one end of the second transmission line is electrically connected to the first transmission line and the other end of the second transmission line is an open connection.

7. The Doppler radar sensor in accordance with claim 1, wherein the radar further includes a first power divider and a circulator, the first power divider is electrically connected to the signal generator and configured to receive and divide the radio frequency signal into two paths, the circulator is electrically connected to the first power divider and the bondwire interconnection and configured to receive the radio frequency signal of one path from the first power divider and transmit the radio frequency signal to the bondwire interconnection, the reflected signal received by the antenna is transmitted to the circulator.

8. The Doppler radar sensor in accordance with claim 7, wherein the radar further includes a second power divider and a leakage and clutter canceler, the second power divider is electrically connected to the first power divider and configured to receive the radio frequency signal of the other path from the first power divider and divide the radio frequency signal into two paths, the leakage and clutter canceler is electrically connected to the circulator and the second power divider and configured to receive the reflected signal from the circulator and the radio frequency signal of one path from the second power divider, the leakage and clutter canceler is configured to cancel a clutter in the reflected signal and a leakage signal of the radar by the radio frequency signal, the demodulator is electrically connected to the second power divider and the leakage and clutter canceler and configured to receive the radio frequency signal of the other path from the second power divider and the reflected signal from the leakage and clutter canceler.

9. The Doppler radar sensor in accordance with claim 8, wherein the signal generator, the demodulator, the first power divider, the circulator, the second power divider and the leakage and clutter canceler of the radar are integrated in a chip, the radar and the bondwire interconnection are integrated in an integrated circuit.

10. A Doppler radar sensor, comprising:
- a radar including a signal generator, an antenna and a demodulator, the signal generator is configured to generate a radio frequency signal, the antenna is configured to receive and radiate the radio frequency signal as a wireless signal to an object and further configured to receive a reflected signal from the object, the demodulator is coupled to the signal generator and the antenna and configured to receive the radio frequency signal and the reflected signal, the demodulator is configured to demodulate the reflected signal by using the radio frequency signal as a reference signal to obtain a displacement signal; and
- a bondwire interconnection coupled to the antenna and the signal generator, the antenna is coupled to the signal generator via the bondwire interconnection, wherein the bondwire interconnection includes a first metal strip, a first shunt bondwire and a second shunt bondwire, two ends of the first shunt bondwire are coupled to the signal generator and the first metal strip, respectively, and two ends of the second shunt bondwire are coupled to the first metal strip and the antenna, respectively;
- wherein the radar further includes a first power divider and a circulator, the first power divider is electrically connected to the signal generator and configured to receive and divide the radio frequency signal into two paths, the circulator is electrically connected to the first power divider and the bondwire interconnection and configured to receive the radio frequency signal of one path from the first power divider and transmit the radio frequency signal to the bondwire interconnection, the reflected signal received by the antenna is transmitted to the circulator.

11. The Doppler radar sensor in accordance with claim 10, wherein the radar further includes a second power divider and a leakage and clutter canceler, the second power divider is electrically connected to the first power divider and configured to receive the radio frequency signal of the other path from the first power divider and divide the radio frequency signal into two paths, the leakage and clutter canceler is electrically connected to the circulator and the second power divider and configured to receive the reflected signal from the circulator and the radio frequency signal of one path from the second power divider, the leakage and clutter canceler is configured to cancel a clutter in the reflected signal and a leakage signal of the radar by the radio frequency signal, the demodulator is electrically connected to the second power divider and the leakage and clutter canceler and configured to receive the radio frequency signal of the other path from the second power divider and the reflected signal from the leakage and clutter canceler.

12. The Doppler radar sensor in accordance with claim 11, wherein the signal generator, the demodulator, the first power divider, the circulator, the second power divider and the leakage and clutter canceler of the radar are integrated in a chip, the radar and the bondwire interconnection are integrated in an integrated circuit.

* * * * *